G. Fincken.
Sugar Carriage.
No. 16,051. Patented Nov. 11, 1856.
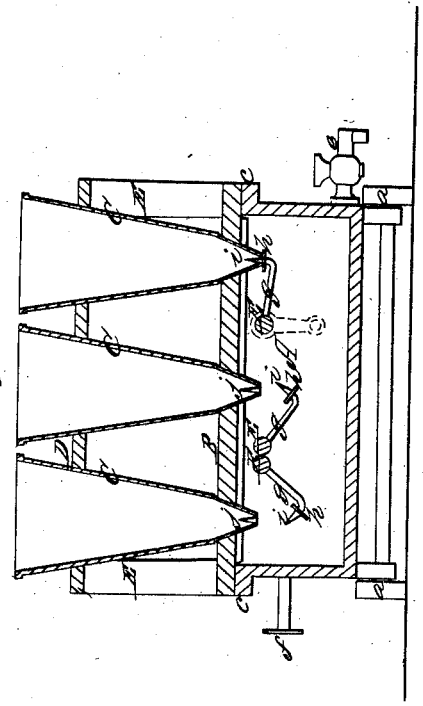
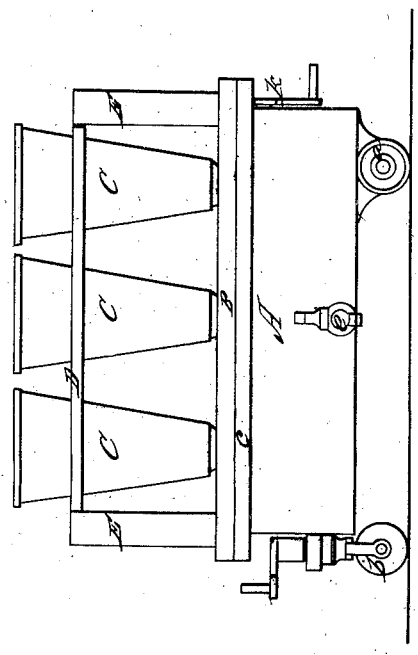
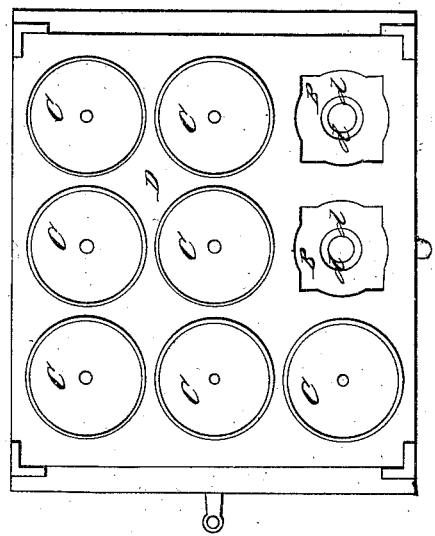

UNITED STATES PATENT OFFICE.

GUSTAVUS FINCKEN, OF BROOKLYN, NEW YORK.

SUGAR-DRAINING APPARATUS.

Specification forming part of Letters Patent No. 16,051, dated November 11, 1856.

*To all whom it may concern:*

Be it known that I, GUSTAVUS FINCKEN, of the city of Brooklyn, in the county of Kings and State of New York, have invented a new and useful Improvement in the Apparatus Employed in the Process of Refining Sugar; and I do hereby declare that the following is a full, clear, and exact description of the same, reference being had to the accompanying drawings, forming part of this specification.

This invention relates to that part of the apparatus which is employed to contain the molds during the crystallization of the sugar therein and the draining of the sirup therefrom.

It consists in providing for the reception of any number of molds a carriage constructed, substantially as hereinafter described, so as to support the molds in upright positions and enable them to be run one at a time under a faucet in the cooler, from which they are filled, and with a suitable receptacle, into which the sirup may be allowed to drain either by gravitation or by atmospheric pressure, said carriage being also furnished with a number of movable stoppers, and operating, as hereinafter described, to close the molds for filling and to open them for draining.

To enable other skilled in the art to make and use my invention, I will proceed to describe its construction and operation.

Figure 1 in the drawings is a side view of a mold-carriage. Fig. 2 is a plan of the same, and Fig. 3 a transverse vertical section of the same.

Similar letters of reference indicate corresponding parts in the several figures.

A is a quadrangular box or vessel, of cast-iron or other material, constituting the lower portion or body of the mold-carriage, mounted on a pair of wheels, $a\,a$, and a third wheel, $b$, which is a guiding-wheel.

B is a plate forming a cover to the vessel A, and secured to the flanges $c\,c$ thereof by bolts. This plate contains a number of conical seats, $d\,d$, arranged in rows to receive the conical bottoms of the molds C C, two of which seats are exposed to view in the plan, Fig. 2, by the omission of two molds from the carriage.

D is a frame or plate containing openings for the reception of the upper parts of the molds, supported upon pillars E E, and serving to hold the molds upright when resting on their seats in the plate B. The vessel A is furnished with a cock, $e$, near the bottom, to draw off the sirup, and if atmospheric pressure is to be used to extrude the sirup from the sugar the vessel must be furnished with a nozzle, as represented at $f$, and suitable means of connecting the same with a pipe leading to an air-pump by which a vacuum is to be produced in the vessel A.

F F are shafts fitted to work in bearings in the sides or ends of the vessel, each carrying arms $g$, corresponding in number with the mold-seats in each row, and arranged under the mold-seats. To the ends of these arms are attached the stoppers $h\,h$, by which the holes in the bottoms of the molds are closed up previously to the filling. Each shaft F F is furnished with a crank, $k$, outside of the vessel A, by which it can be moved so as to bring all the stoppers attached to it in operation at one and the same time to close or open the holes in the molds. These stoppers are made like valves to fit round the holes in the molds, but are provided each with a long and pointed pin, $i$, to enter some distance into the mold, as shown in the extreme right-hand mold in Fig. 2, in order that when withdrawn from the molds at the proper time they may leave cavities in the sugar of the form shown at $j'\,j$ in two of the molds in Fig. 2, from which the stoppers are supposed to have been withdrawn. These cavities in the sugar, which are for the purpose of leaving a comparatively large surface for the sirup to drain through, are generally formed by a hand-punch after the removal of the stoppers from the molds; but by attaching a pin, $i$, to each stopper the labor of punching the molds one at a time is dispensed with. In order to insure the stoppers coming exactly into the center of the holes and fitting properly when inserted thereinto, they may be attached to the arms $g\,g$ by some kind of joint which allows a limited movement in any direction.

The mode of operation with this apparatus is as follows: The carriage, having as many molds placed within it as it is capable of carrying and the stoppers inserted in their holes, is wheeled to the cooler from whence the molds are to be filled, and moved to bring each of the molds in turn under the faucet or other outlet of the cooler. When all have been filled the carriage is wheeled away to any convenient place, and another carriage of molds brought to the cooler. The carriages containing the filled molds are arranged close together, and the crystallization and draining of the sugar are effected in them without occupying more room than by the ordinary arrangement of molds, and the heavy labor of carrying the sugar in ladles to the molds is dispensed with. When the sugar has stood long enough in the molds, the stoppers are all removed at once by simply turning the cranks on the ends of the shafts F F to the proper position, and the draining then commences. Spouts or conductors are to be placed under the cocks $e$, to allow the sirup to be drawn from the vessels A and conveyed to a suitable receptacle. If atmospheric pressure is to be used to drive out the sirup, connection can be made from an air-pump to any number of the vessels A by pipes and union joints to $f f$. In that case the seats $d\ d$ should be lined with india-rubber, so as to make an air-tight connection between the molds and the vessel A.

What I claim as my invention, and desire to secure by Letters Patent, is—

The employment for the reception of the molds of a wheel-carriage composed of a box or vessel, A, with seats $d\ d$ to receive the molds and a frame, D, to keep them upright, and with stoppers $h\ h$, so applied within the box or vessel as to enable several to be inserted in or withdrawn from their respective molds simultaneously by a crank or its equivalent at one end or side of the carriage, as herein fully described.

GUST. FINCKEN.

Witnesses:
JAMES F. BUCKLEY,
S. W. COOMBS.